United States Patent [19]

Vashi et al.

[11] Patent Number: 5,604,415
[45] Date of Patent: Feb. 18, 1997

[54] BATTERY LOCKOUT CIRCUIT AND BATTERY PACK USING SAME

[75] Inventors: Dipti Vashi, Lawrenceville; Vernon Meadows, Lilburn; Scott M. Garrett, Lawrenceville, all of Ga.

[73] Assignee: Motorola, Inc., Schaumburg, Ill.

[21] Appl. No.: 578,773

[22] Filed: Dec. 26, 1995

[51] Int. Cl.[6] .................................................. H01M 10/46
[52] U.S. Cl. .............................. 320/12; 320/40; 320/49
[58] Field of Search ........................... 320/2, 5, 27, 31, 320/39, 48, 49, 43, 40, 12

[56] References Cited

U.S. PATENT DOCUMENTS

| | | |
|---|---|---|
| 4,686,444 | 8/1987 | Park ................................. 320/31 |
| 5,017,856 | 5/1991 | Johnson, Jr. ..................... 320/2 |
| 5,462,814 | 10/1995 | Fernandez et al. ............. 320/2 X |
| 5,518,832 | 5/1996 | Fernandez et al. ............. 320/31 X |

*Primary Examiner*—Edward H. Tso
*Attorney, Agent, or Firm*—Kenneth M. Massaroni; Scott M. Garrett

[57] ABSTRACT

A lockout circuit is provided in a battery pack (10) which blocks charging by incompatible chargers while allowing charging by a compatible charger (12). The battery comprises a battery cell or cells (22), and a switch circuit (24). The switch circuit blocks charge current until a switch disable signal is provided to a switch disable contact (18). The switch circuit provides a one way bypass so that the battery may provide power to a device. To eliminate voltage drop while powering a device, a current sense circuit is provided to detect discharge current, and disable the switch circuit.

24 Claims, 2 Drawing Sheets

5,604,415

BATTERY LOCKOUT CIRCUIT AND BATTERY PACK USING SAME

TECHNICAL FIELD

This invention relates in general to batteries, and more particularly to battery packs having lockout circuits to block charging of the battery pack by an incompatible charger.

BACKGROUND

Battery powered devices, such as cellular telephones and portable computers, for example, have gained appreciable market acceptance. Such devices offer portability and convenience to users, and many users have come to rely on them. The utility of portable devices is affected by the energy storage capacity of their associated battery pack. Conventional battery systems for portable devices are centered around nickel cadmium (NiCd) and nickel metal-hydride (NiMH) battery technologies, which are referred to collectively as nickel systems. Nickel systems provide robust batteries, and a great many accessories have been produced for them including chargers.

More recently, another battery system, lithium ion (Li-ion) has been brought to the marketplace. It offers significantly more energy storage capacity than nickel system batteries for a given weight, making it a very attractive alternative. Since most devices typically outlive the useful life of their associated batteries, it would be desirable to package Li-ion battery cells in a form so that existing portable products can take advantage of the increased energy storage offered by Li-ion. However, Li-ion is not recharged in the same manner as nickel system batteries.

Nickel system batteries are charged by applying a constant current at a predetermined rate, and monitoring at least one battery parameter until the parameter(s) indicates that the nickel system battery is near fully charged. An example of this would be to monitor battery temperature until the rate of temperature rise reaches a level indicative of a fully charged battery. A great many chargers have been sold into the market place that use this charge regime.

Li-ion, conversely, requires a somewhat different charge regime. It is charged by a constant current followed by a constant voltage charge regime. The voltage regulation of the constant voltage portion must be very precise. If the voltage is too low, the battery cells may not develop sufficient capacity. If the voltage is too high, the battery cell may become damaged. Since nickel system chargers are not typically designed to provide a constant voltage charge, Li-ion batteries are not easily retrofittable into existing nickel system chargers. By use of sophisticated electronics, it is possible to produce a retrofittable Li-ion battery, but the additional cost may be prohibitive to certain portions of the market. Some consumers may be more inclined to purchase chargers designed for Li-ion battery charging for use with a Li-ion battery that fits on an existing device.

Therefore there exists a need whereby a battery, such as a Li-ion battery, can be packaged so that a device can use the battery, and the battery has a means to lockout charging by an incompatible charger, and allow charging by a compatible charger. By incompatible it is meant that the charger, while able to receive the battery in a physical sense, is not designed to provide a compatible charge regime.

DETAILED DESCRIPTION OF THE PREFERRED EMBODIMENT

Figure 1:
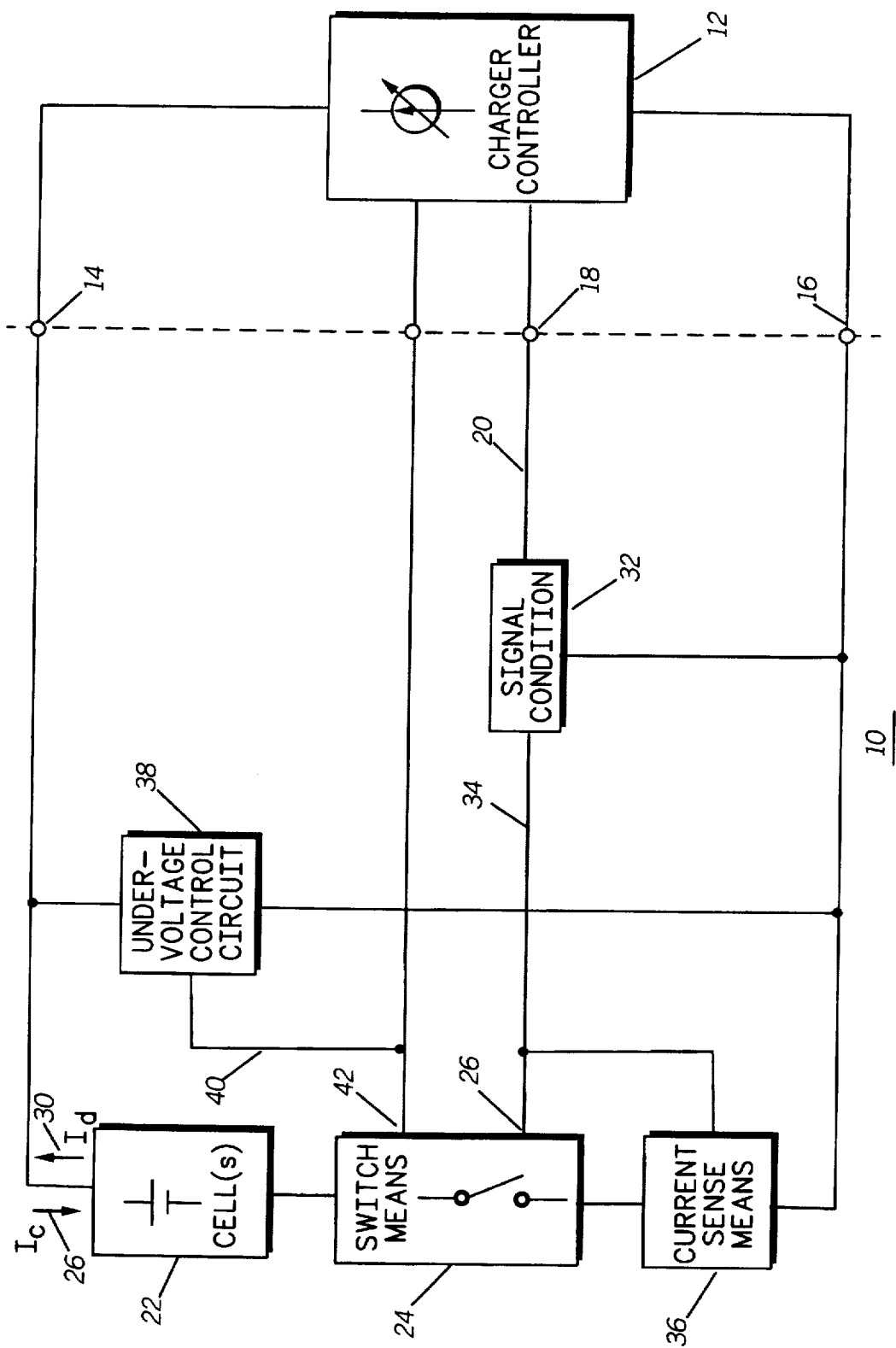
FIG. 1 is a block diagram of a battery pack in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a block diagram of a battery pack 10 in accordance with the invention. The battery pack is shown connected to a charger 12 at positive contact 14 and negative contact 16. In addition, the battery pack has a means for receiving a switch disable signal, such as switch disable contact 18, so that a compatible charger may provide a switch disable signal to the battery pack on line 20. The charger provides current to the battery pack to recharge the battery cell or cells 22 housed in the battery pack. It should be appreciated that, although only a singualr battery cell may be referred to for discussion purposes, any number of series and/or parallel connected battery cells will function equally well with the invention. The charger 12 provides a charge regime which is compatible with the battery cell or cells 22. The battery pack has a lockout circuit comprised of a switch means 24 coupled in series with the battery cell or cells. The switch means has at least an over-voltage input 26.

The switch means blocks charging by an incompatible charger, but allows discharging of the battery cell. Charging and discharging refer to the direction of current through the battery cell. Current provided by the charger, in the direction of arrow 28 is charging the battery cell, while current in the direction of arrow 30 is discharging the battery cell. These terms are well understood in the art. The switch means 24 blocks current until receiving a switch disable signal at the over-voltage input 26. Incompatible chargers will not be able to provide the switch disable signal, and therefore will not be able to charge the battery cell. A compatible charger will provide the switch disable signal, thus disabling the switch means to allow a charging current.

In the simplest embodiment the switch disable contact 18 is directly connected to the over-voltage input 26, and the compatible charger simply applies a sufficient DC voltage to disable the switch means. However, as a safety precaution, it is preferred that a DC voltage not be able to disable the switch means. Accordingly, the preferred embodiment of the invention includes a signal conditioning means 32 which receives the switch disable circuit on line 20, and converts into a conditioned switch disable signal on line 34. The conditioned switch disable signal disables the switch means to allow charging.

Since the switch means 24 allows discharging of the battery cell, it comprises a one way bypass, such as, for example, a diode. This bypass causes a voltage drop across the switch means during discharge. This voltage drop lowers the available voltage to whatever device the battery is used to power, and is thus undesirable. Accordingly, a current sense means 36 is provided, and has a portion coupled in series with the battery cell and an output coupled to the over-voltage input 26 of the switch means. When the current sense means senses a discharge current, it provides substantially the switch disable, or conditioned switch disable signal to the switch means, thus disabling the switch means. In this sense, the switch means and current sense means function together to provide a one way lossless switch. The two working together function effectively as sort of a diode having no forward voltage drop.

The preferred embodiment allows for the battery cell to be at least one Li-ion battery cell. When this is the case, the battery pack should comprise additional circuitry such as an under-voltage control circuit 38. The under-voltage control circuit senses the voltage across either the battery cell, or preferably, the battery pack, as shown here. It also has an output 40 connected to an under-voltage input 42 of the switch means. If the sensed voltage drops to a pre-determined under-voltage threshold, the under-voltage control circuit provides a signal to the under-voltage input which causes the switch means to block discharge current through the battery cell. Under-voltage control circuits are increasingly found in Li-ion battery packs.

Figure 2:
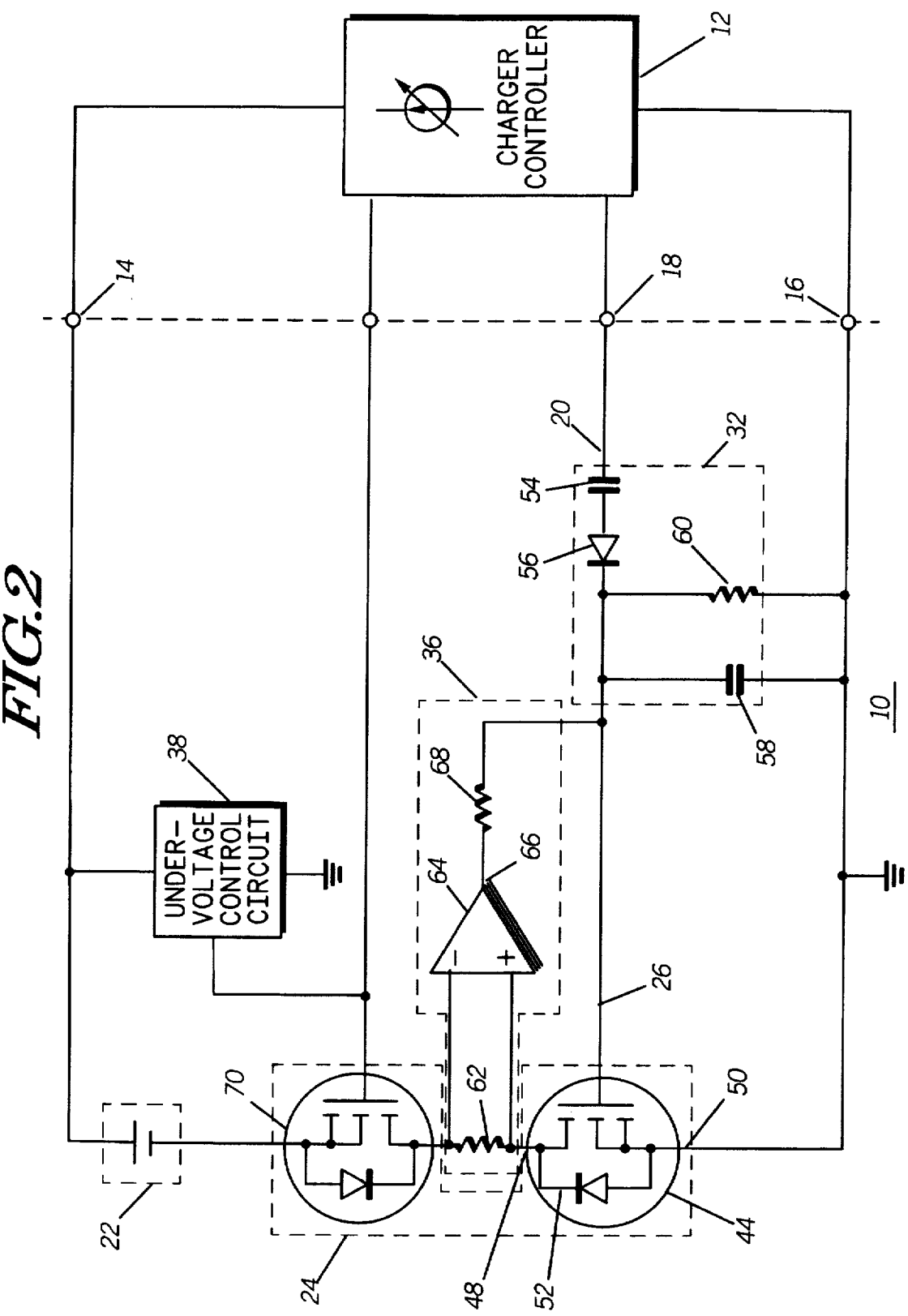
FIG. 2 is a schematic diagram of a preferred embodiment of the invention.

A specific example of a preferred embodiment of the invention is provided in FIG. 2. Referring now to FIG. 2, there is illustrated therein, as in FIG. 1, a battery pack 10 connected to a charger 12. Here the pertinent circuits and means are shown and described in more detail. Beginning with the battery cell or cells 22, there is at least one battery cell, and the present invention provides for it to be at least one lithium ion battery cell.

The switch means 24 comprises at least a lockout or over-voltage switch 44, which is preferably a MOSFET having a gate 46, drain 48, source 50, and an intrinsic diode 52. The gate 46 acts as the over-voltage input previously described, and the drain and source are coupled in series with the battery cell or cells with the source connected to the negative contact 16. From this arrangement it will be appreciated by those skilled in the art that the intrinsic diode 52 of the MOSFET will allow discharge current to pass through the switch means. The MOSFET is operated in either an ON or OFF state, and is operated in the OFF state to block charge current until the appropriate signal is received. To change the MOSFET from the OFF to the ON state, a DC voltage exceeding a threshold must be applied to the gate.

In the preferred embodiment, the switch disable signal applied to the switch disable contact by the charger has an AC component. The signal conditioning means comprise a DC blocking rectifier circuit to both block any DC component in the applied switch disable signal, and convert the AC component into the necessary DC voltage level. The DC blocking is provided by a series capacitor 54, while the rectification of the AC component is provided by a series diode 56 appropriately oriented. Typically a diode rectifier circuit comprises a shunt capacitor 58 to sustain the DC voltage, however, it is contemplated that the gate-source capacitance of the MOSFET may provide enough capacitance. To keep the MOSFET from remaining in the ON state once the switch disable signal is terminated, a shunt resistor 60 is provided to bleed off charge from the capacitance on line 26.

To avoid the voltage drop of the intrinsic diode 52 while powering a device, the current sense means comprises a current sense element, such as sense resistor 62 coupled in series with the battery cell. Connected across the current sense element are the inputs of a comparator 64. The output 66 of the comparator is resistively coupled to the over-voltage input of the switch means through output resistor 68. It is contemplated that the comparator is an op-amp connected substantially as shown to provide a comparator function. It is also contemplated that instead of using a current sense resistor, the intrinsic diode 52 may act as the current sense element. It will provide the appropriate sense signal when the battery cell is discharged.

When the battery cell is a Li-ion battery cell, the battery pack should also comprise an under-voltage switch 70 to block discharge current once the battery voltage drops to the under-voltage threshold. The under-voltage switch is connected to the under-voltage control circuit 38, which controls the under-voltage switch accordingly. It is preferred that the under-voltage switch is a MOSFET to minimize loss when the switch is ON, and to minimize current drain necessary for operation.

An appreciation of how the invention is practiced may be obtained by the following examples. First, assume that the charger 12 is incapable of providing the correct charge regime for the battery cell 22. This would be the case if the battery cell 22 is a Li-ion battery cell, and the charger is a nickel system charger. For purposes of product compatibility the battery pack 10 is packaged in a form that would allow a user to place the battery pack into the incompatible charger. Upon detection of the battery pack, the charger attempts to charge the battery cell. However, as no switch disable signal is provided by the incompatible charger, the switch means blocks the attempt to charge the battery cell, thus protecting it from undesired electrical stress.

A second example is similar to the first, except that the charger 12 is now a compatible charger. Once the battery is detected, the compatible charger provides a switch disable signal to the switch disable contact. If the battery incorporates the signal conditioning means, then the signal provided by the charger will have at least an AC voltage component. If the switch disable contact is directly connected to the switch means, then the compatible charger need only provide the necessary DC bias voltage to turn on the switch means. Once the signal has been provided, the charger is free to commence charging, which it does subsequently.

A third example illustrates how the invention operates when powering a device. Assume that the charger 12 is a device to be powered. Upon turning the device on, a current is drawn form the battery cell. This current passes through the device in the direction of arrow 30, and back to the battery pack through the negative contact 16. The current sense means detects the discharge current, and provides the necessary bias voltage to disable the switch means. This removes the voltage drop that would otherwise be produced by the switch means bypass, which could be, for example, the intrinsic diode 52.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A lockout circuit for preventing a battery from being charged by an incompatible charger and allowing charging by a compatible charger, said battery having at least one battery cell, positive and negative contacts, said lockout circuit comprising:

switch means coupled in series with said at least one battery cell, and having at least an over-voltage input;

signal conditioning means for receiving and conditioning a switch disable signal from said compatible charger, and providing a conditioned switch disable signal to said over-voltage input of said switch means; and wherein said switch means blocks charging of said at least one battery cell until receiving substantially said conditioned switch disable signal at said over-voltage input.

2. A lockout circuit as defined by claim 1, wherein said switch means comprises a MOSFET having a gate, drain, and source, said drain and said source coupled in series with said at least one battery cell, and said source connected to said negative contact, said gate being said over-voltage input.

3. A lockout circuit as defined by claim 1, wherein said signal conditioning means is a DC blocking rectifier circuit for converting an AC voltage component into a DC voltage level.

4. A lockout circuit as defined by claim 3, wherein said DC blocking rectifying circuit comprises a series diode and capacitor and a shunt resistor.

5. A lockout circuit as defined by claim 4, further comprising a shunt capacitor.

6. A lockout circuit as defined by claim 1, wherein said switch means produces a voltage drop upon discharging said at least one battery cell, said lockout circuit further comprises a current sense means for sensing a discharge current and providing substantially said conditioned switch disable signal to said over-voltage input of said switch means to disable said switch means.

7. A lockout circuit as defined by claim 6, wherein said current sense means comprises a comparator having an output resistively coupled to said over-voltage input, and two inputs coupled across a current sense element.

8. A lockout circuit as defined by claim 7, wherein said current sense element is a resistor coupled in series with said at least one battery cell.

9. A lockout circuit as defined by claim 1, wherein said at least one battery cell is at least one lithium ion battery cell, and said incompatible charger is a charger designed to charge nickel system batteries.

10. A battery pack for powering a device and blocking charging by an incompatible charger, comprising:

at least one battery cell;

positive and negative contacts for allowing a compatible charger to charge said at least one battery cell;

a switch disable contact for receiving a switch disable signal from said compatible charger;

switch means coupled in series with said at least one battery cell, and having at least an over-voltage input;

signal conditioning means for receiving and conditioning said switch disable signal and providing a conditioned switch disable signal to said over-voltage input of said switch means; and wherein said switch means blocks charging of said at least one battery cell until receiving said conditioned switch disable signal at said over-voltage input.

11. A battery pack as defined by claim 10, wherein said switch means comprises a MOSFET having a gate, drain, and source, said drain and said source coupled in series with said at least one battery cell, and said source connected to said negative contact, said gate being said over-voltage input.

12. A battery pack as defined by claim 10, wherein said signal conditioning means is a DC blocking rectifier circuit for converting an AC voltage component into a DC voltage level.

13. A battery pack as defined by claim 12, wherein said DC blocking rectifying circuit comprises a series diode and capacitor and a shunt resistor.

14. A battery pack as defined by claim 13, further comprising a shunt capacitor.

15. A battery pack as defined by claim 10, wherein said switch means produces a voltage drop upon discharging said at least one battery cell, said battery pack further comprises a current sense means for sensing a discharge current and providing substantially said conditioned switch disable signal to said over-voltage input of said switch means to disable said switch means.

16. A battery pack as defined by claim 15, wherein said current sense means comprises a comparator having an output resistively coupled to said over-voltage input, and two inputs coupled across a current sense element.

17. A battery pack as defined by claim 16, wherein said current sense element is a resistor coupled in series with said at least one battery cell.

18. A battery pack as defined by claim 10, wherein said at least one battery cell is at least one lithium ion battery cell, and said incompatible charger is a charger designed to charge nickel system batteries.

19. A battery pack, comprising:

at least one battery cell;

a MOSFET coupled in series with said at least one battery cell;

a DC blocking rectifier circuit connected between said MOSFET and a switch disable contact;

a comparator having an output resistively connected to said MOSFET, and two inputs connected across a current sense element, said current sense element for sensing current through said at least one battery cell; and wherein said MOSFET blocks charging of said at least one battery cell until a switch disable signal is applied to said switch disable contact, said comparator disabling said MOSFET when said at least one battery cell provides a discharge current.

20. A battery pack as defined by claim 19, wherein said DC rectifying circuit comprises a series diode and capacitor and a shunt resistor.

21. A battery pack as defined by claim 20, further comprising a shunt capacitor.

22. A battery pack for use only with a compatible charger, comprising:

at least one battery cell;

a MOSFET coupled in series with said at least one battery cell having a gate, an ON state, and an OFF state, said MOSFET normally in said OFF state;

means for receiving a switch disable signal from said compatible charger connected to said MOSFET for switching said MOSFET to said ON state;

a current sense element coupled in series with said at least one battery cell;

an op-amp having inputs connected across said current sense element and an output resistively coupled to said gate of said MOSFET, said op-amp providing voltage to said gate of said MOSFET such that said MOSFET is in said ON state when said current sense element indicates said at least one battery cell is discharging.

23. A battery pack as defined in claim 22, wherein said at least one battery cell is at least one lithium ion battery cell.

24. A battery pack as defined by claim 22, wherein said switch disable signal has an AC component, said battery pack further comprises a DC blocking rectifier circuit coupled between said means for receiving and said gate of said MOSFET for blocking DC voltage applied to said means for receiving and rectifying said AC component to provide a DC voltage to said gate.

* * * * *